United States Patent [19]

Gabriël

[11] Patent Number: 5,557,318
[45] Date of Patent: Sep. 17, 1996

[54] METHOD AND APPARATUS FOR PERMITTING A VIEWER TO SCAN THROUGH A PLURALITY OF VIDEO SIGNALS PROVIDED BY A TRANSMITTER

[75] Inventor: Christiaan M. W. Gabriël, Leiden, Netherlands

[73] Assignee: Koninklijke PTT Nederland N.V., Netherlands

[21] Appl. No.: 499,571

[22] Filed: Jul. 7, 1995

[30] Foreign Application Priority Data

Jul. 12, 1994 [NL] Netherlands ............................ 9401150

[51] Int. Cl.$^6$ ...................................................... H04N 7/10
[52] U.S. Cl. .................... 348/7; 348/12; 455/4.2
[58] Field of Search ................ 348/6, 7, 12, 13, 348/441, 469, 384, 385; 455/4.2; H04N 7/10

[56] References Cited

U.S. PATENT DOCUMENTS

| | | | |
|---|---|---|---|
| 4,843,468 | 6/1989 | Drewery | 348/441 |
| 4,975,771 | 12/1990 | Kassatly | 348/385 |
| 5,253,275 | 10/1993 | Yurt et al. | 348/7 |
| 5,319,455 | 6/1994 | Hoarty et al. | 348/7 |
| 5,421,031 | 5/1995 | De Bey | 348/7 |
| 5,459,506 | 10/1995 | Bushnell | 348/7 |

FOREIGN PATENT DOCUMENTS 0578201  1/1994  European Pat. Off. .

OTHER PUBLICATIONS

R. David et al., "A Belgian Broadband ATM Experiment", XIII International Switching Symposium, Stockholm, Sweden, May 27–Jun. 1, 1990, Proceedings, vol. III, pp. 1–6.

R. Monnier et al., "Four 4:2:2 quality programmes and one HDTV programme in a single standard TV channel", 18th International Television Symposium and Technical Exhibition, Montreux, Switzerland, Jun. 10–15, 1993, Table of Contents and pp. 523–543.

D. Reininger et al., "Statistical Multiplexing of VBR MPEG Compressed Video on ATM Networks", Proceedings of IEEE Infocom '93, IEEE Computer Society, jPress, Los Alamitos, California, Apr. 1, 1993, vol. 3, Title page and pp. 919–926.

*Primary Examiner*—Victor R. Kostak
*Attorney, Agent, or Firm*—Peter L. Michaelson; Michael P. Straub; Michaelson & Wallace

[57] ABSTRACT

Method and apparatus for providing a receiver a high quality video signal and a plurality of lower quality video signals which can be zapped, i.e., searched through at any given time, via a channel having a limited data capacity. A first set of high quality video signals is present at a transmitter, e.g., fifty programs having a 10 Mbit/s data rate. A second set of video signals which is a subset of the first set of video signals is sent to the receiver in response to a control signal which indicates the programs a viewer has selected to be viewed at high quality, e.g., using the full 10 Mbit/s of data. A third set of video signals is also sent from the transmitter to the receiver. This third set of video signals represents low quality programs, e.g., signals having a 1 Mbit/s data rate, which can be searched. The video signals in the third set of video signals correspond to signals in the first set of video signals but have a video data content that is only a fraction of that of the corresponding video signals. When all programs present at the transmitter are supplied to the receiver as lower quality, e.g., 1 Mbit/s, video signals, it is possible to search through all the programs without having to send the transmitter a control signal to implement the search and without overloading the data capacity of the channel used to provide the video signals.

28 Claims, 3 Drawing Sheets

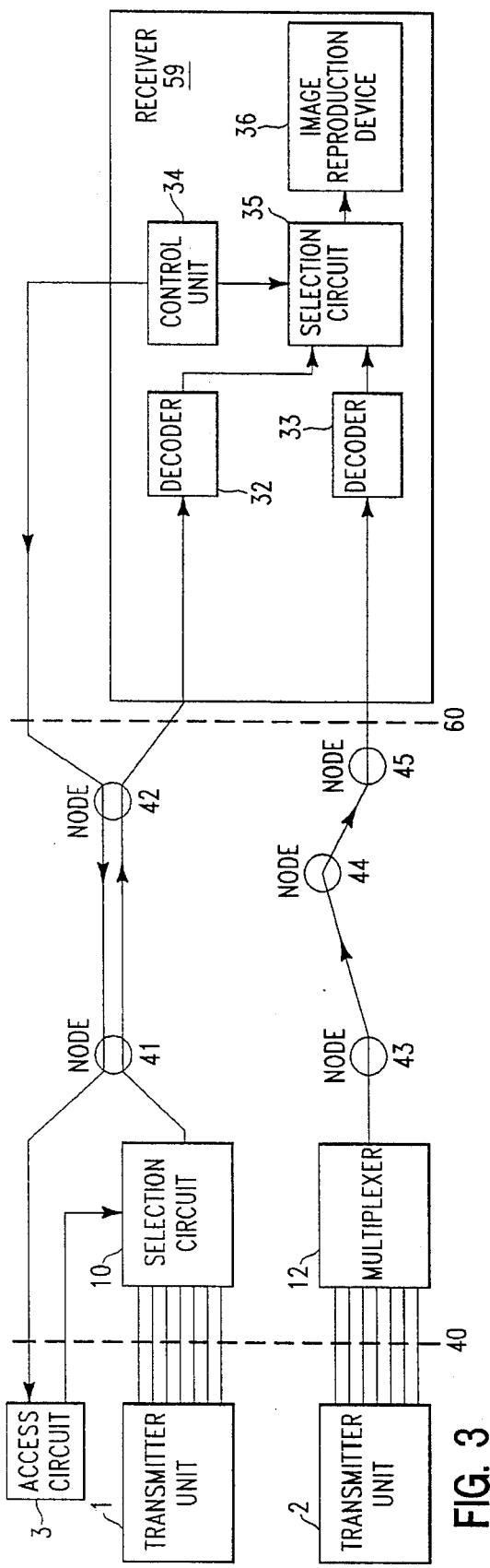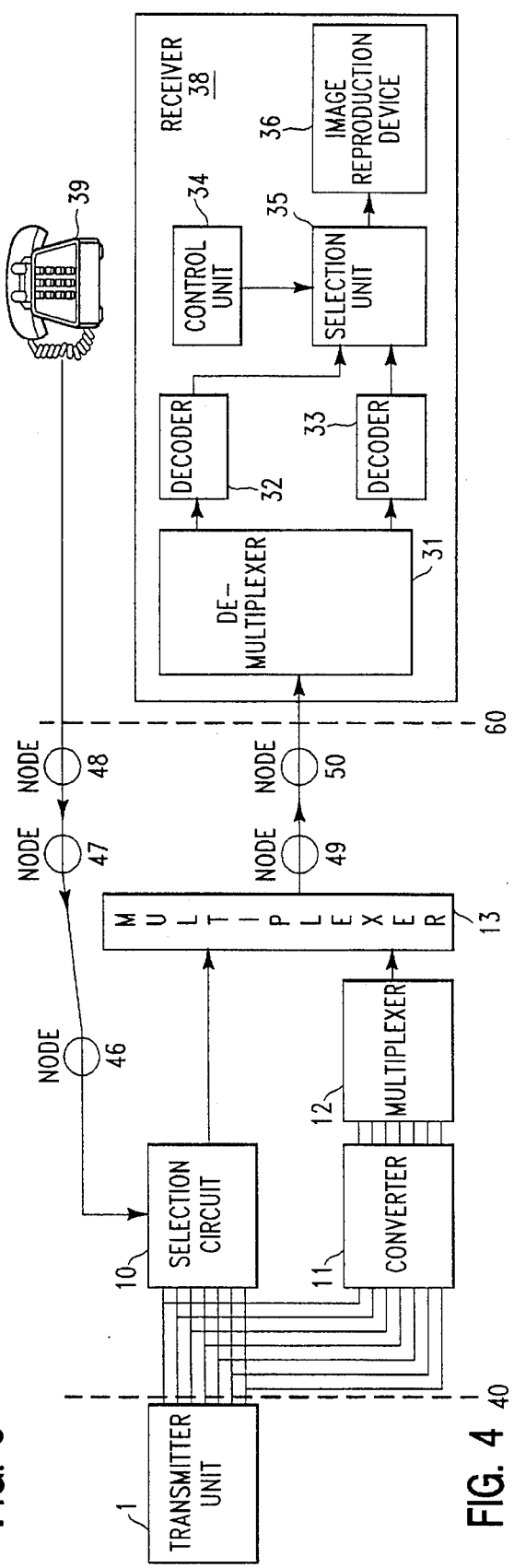

METHOD AND APPARATUS FOR PERMITTING A VIEWER TO SCAN THROUGH A PLURALITY OF VIDEO SIGNALS PROVIDED BY A TRANSMITTER

Method for offering, at a receiver side, a first number of video signals originating from a transmitting side, also system, transmitter, network and receiver

BACKGROUND OF THE INVENTION

The invention relates to a method for offering, at a receiver side, a first number of video signals originating from a transmitting end, which method comprises the steps of transmitting a control signal from the receiver side to the transmitting end, and in response to the control signal, selecting at the transmitting end and transmitting to the receiver side a second number of video signals, which second number of video signals comprises a portion of the first number of video signals.

Such a method is generally known and is used if the capacity of a channel situated between the transmitting end and the receiver side is insufficient to offer the entire first number of video signals of, for example, fifty television programs of high quality collectively via said channel. In that case, only the second number of video signals of, for example, ten television programs of high quality are collectively offered via the channel. Each video signal belonging to the second number of video signals is available to the receiver side and only if the reception of a video signal belonging to the first number of video signals and not belonging to the second number of video signals is desired should a control signal be transmitted from the receiver side (by a receiver or a device, such as, for example, a telephone set, situated in the vicinity of the receiver). In response to said control signal, a modified second number of video signals is then transmitted from the transmitting end to the receiver side.

This known method has, inter alia, the disadvantage that a receiver (or a device, such as, for example, a telephone set, situated in the vicinity of the receiver) has to transmit different control signals if it is desired to run through briefly (the so-called "zapping") video signals belonging to the first number of video signals and not belonging to the second number of video signals. In particular, at the end of popular television programs, many viewers will want to run through the total range of television programs at approximately the same instant via many receivers, which entails a high loading for the signaling and could result in unacceptable delays.

SUMMARY OF THE INVENTION

The object of the invention is, inter alia, to provide a method of the type mentioned in the introduction which makes it possible for all the receivers to run through at the same instant at least video signals belonging to the first number of video signals and not belonging to the second number of video signals without the signaling being overloaded thereby.

For this purpose, the method according to the invention has the characteristic that the method comprises the further step of transmitting from the transmitting end to the receiver side a third number of video signals of lower quality than the second number of video signals, which third number of video signals comprises at least another portion of the first number of video signals.

As a result of transmitting, independently of a control signal to be transmitted from the receiver side, the third number of video signals collectively to the receiver side, the receiver side furthermore has available, in addition to the second number of video signals, video signals belonging to the first number of video signals and not belonging to the second number of video signals, with the result that no control signals are needed to select said video signals, as a result of which the signaling is not loaded. Owing to the fact that said third number of video signals is of lower quality than the second number of video signals, each video signal belonging to the third number of video signals will occupy much less of the total channel capacity than a video signal belonging to the second number of video signals, and further channel capacity could be released by scrapping one or more video signals belonging to the second number of video signals. Thus, in a first situation, for example, eight television programs of high quality (for example, at 10 Mbit/s) and twenty other television programs of lower quality (for example, at 1 Mbit/s) could be offered. In this case, therefore, the receiver side simultaneously has available twenty-eight television programs of high or lower quality, which will then generally be chosen from the total range of fifty television programs on the basis of personal preference. Thus, in a second situation, for example, one or two television programs of high quality (for example, at 10 Mbit/s) and, respectively forty-nine or forty-eight other television programs of lower quality (for example, at 1 Mbit/s) could be offered. In this case, therefore, the receiver side simultaneously has available the total range of fifty television programs of high or lower quality which, then of course, no longer need to be chosen from the total range of fifty television programs on the basis of personal preference.

The invention is based, inter alia, on the insight that the brief running through of at least video signals belonging to the first number of video signals and not belonging to the second number of video signals can be permitted with a lower quality for the video signals concerned and that a certain video signal can be chosen in this way, which is then selected, by transmitting a control signal, after which said certain video signal is received with high quality by the receiver side. The problem of a limited channel capacity for the transmission of video signals with high quality is thus solved as regards to the ability to run briefly through a larger number of video signals than the number of video signals of high quality to be transmitted via the channel by offering a further number of video signals with lower quality. In the reference entitled "A BELGIAN BROADBAND ATM-EXPERIMENT", this problem is extensively discussed, a certain choice of the second number of video signals only being mentioned as solution without the possibility of transmitting the third number of video signals of lower quality being discussed.

An embodiment of the method according to the invention has the characteristic that the third number of video signals corresponds to the first number of video signals.

In this case, all the available video signals of, for example, fifty television programs of low quality are transmitted collectively and the second number of video signals of high quality is transmitted in addition, with the result that no control signal at all is required for briefly running through the total range of television programs. Furthermore, the third number of video signals is then transmitted at the transmitting end completely independently of the second number of video signals, which permits a less complicated design of the transmitting end. In the most efficient case of utilization of the available channel capacity, the second number of video signals then comprises only one video signal. In this case, a television set and a video recorder can be provided simultaneously with the same signal. If the television set and the video recorder are each to be provided simultaneously with another signal, the second number of video signals should comprise at least two video signals, unless one of the two appliances can be provided with a signal of lower quality.

The invention furthermore relates to a system comprising at least one channel, at least one receiver coupled to the channel and at least one transmitter coupled to the channel for offering the receiver, via the channel, a first number of video signals originating from the transmitter, which system is provided with generating means for generating a control signal intended for the transmitter, and which system is provided with transmitting means for selecting, in response to the control signal, and transmitting to the receiver a second number of video signals which comprises a portion of the first number of video signals.

Such a system is generally known and is used if the capacity of a channel situated between the transmitter and the receiver is insufficient to offer the entire first number of video signals of, for example, fifty television programs of high quality collectively via said channel. In that case, only the second number of video signals of, for example, ten television programs of high quality is offered collectively via the channel. Each video signal belonging to the second number of video signals is then available to the receiver and only if the reception of a video signal belonging to the first number of video signals and not belonging to the second number of video signals is desired, does the system (the receiver or a device, such as, for example, a telephone set, situated in the vicinity of the receiver) have to transmit a control signal (via the same channel or via another channel). In response to said control signal, the transmitting end then transmits a modified second number of video signals to the receiver side.

Such a known system has, inter alia, the disadvantage that different control signals have to be transmitted from the receiver side if it is desired to run through briefly (the so-called "zapping") video signals belonging to the first number of video signals and not belonging to the second number of video signals. In particular at the end of popular television programs, many receivers will want to run through the total range of television programs approximately at the same instant, which entails a high loading for the signaling and could result in unacceptable delays.

The object of the invention is furthermore, inter alia, to provide a system of the type mentioned above which makes it possible for all the receivers to run through at the same instant at least video signals belonging to the first number of video signals and not belonging to the second number of video signals without the signaling being overloaded thereby.

For this purpose, the system according to the invention has the characteristic that the system is provided with further transmitting means for transmitting to the receiver a third number of video signals which comprises at least another portion of the first number of video signals, which further transmitting means transmit the third number of video signals with lower quality than the second number of video signals to be transmitted by the transmitting means.

As a result of transmitting, independently of a control signal to be transmitted from the receiver side, the third number of video signals collectively to the receiver the receiver furthermore has available, in addition to the second number of video signals, video signals belonging to the first number of video signals and not belonging to the second number of video signals, with the result that no control signals are needed to select said video signals, as a result of which the signaling is not loaded. Owing to the fact that said third number of video signals is of lower quality than the second number of video signals, each video signal belonging to the third number of video signals will occupy much less of the total channel capacity than a video signal belonging to the second number of video signals, and further channel capacity could be released by scrapping one or more video signals belonging to the second number of video signals. Thus, in a first situation, for example, eight television programs of high quality (for example, at 10 Mbit/s) and twenty other television programs of lower quality (for example, at 1 Mbit/s) could be offered. In this case, therefore the receiver simultaneously has available twenty-eight television programs of high or lower quality, which will then generally be chosen from the total range of fifty television programs on the basis of personal preference. Thus, in a second situation, for example, one or two television programs of high quality (for example, at 10 Mbit/s) and, respectively, forty-nine or forty-eight other television programs of lower quality (for example, at 1 Mbit/s) could be offered. In this case, therefore, the receiver simultaneously has available the total range of fifty television programs of high or lower quality, which then, of course, no longer need to be chosen from the total range of fifty television programs on the basis of personal preference.

The invention is furthermore based, inter alia, on the insight that the brief running through of at least video signals belonging to the first number of video signals and not belonging to the second number of video signals can be permitted with a lower quality for the video signals concerned and that a certain video signal can thus be chosen which may then be selected by transmitting a control signal, after which said certain video signal is received with high quality by the receiver. The problem of a limited channel capacity for the transmission of video signals with high quality is thus solved as regards the ability to run briefly through a larger number of video signals than the number of video signals of high quality to be transmitted via the channel by offering a further number of video signals with lower quality.

A first embodiment of the system according to the invention has the characteristic that the further transmitting means are a component of the transmitter.

If the further transmitting means form a component of the transmitter, the third number of video signals is therefore transmitted from the centrally situated transmitter, which simplifies the distribution of said third number of video signals.

A second embodiment of the system according to the invention has the characteristic that the transmitting means are a component of the transmitter.

If the transmitting means form a component of the transmitter, the second number of video signals is therefore transmitted from the centrally situated transmitter, which simplifies the distribution of said second number of video signals.

A third embodiment of the system according to the invention has the characteristic that the system is provided with a network which comprises the channel, the transmitting means being a component of the network and the transmitter being provided with yet further transmitting means for transmitting the first number of video signals.

If the transmitting means form a component of the network and the transmitter is provided with further transmitting means for transmitting the first number of video signals, the network receives said first number of video signals, and the network selects, in response to a control signal to be transmitted from the receiver side, the second number of video signals, which is then transmitted to the receiver by the network. Furthermore, the transmitter generates the third number of video signals. Selection of the second number of video signals thus takes place in the network, while conversion of (a portion of) the first number of video signals into the third number of video signals takes place in the transmitter. An advantage in this connection is that signaling takes place in the network, while the yet further transmitting means and the further transmitting means can be combined in the transmitter.

A fourth embodiment of the system according to the invention has the characteristic that the system is provided with a network which comprises the channel, the further transmitting means being a component of the network and the transmitter being provided with yet further transmitting means for transmitting the first number of video signals.

If the further transmitting means form a component of the network and the transmitter is provided with yet further transmitting means for transmitting the first number of video signals, the network receives said first number of video signals, and the network generates the third number of video signals. Conversion of (a portion of) the first number of video signals into the third number of video signals thus takes place in the network. An advantage in this connection is that a simple transmitter design can be adequate.

A fifth embodiment of the system according to the invention has the characteristic that the transmitting means are a component of the network.

If the transmitting means form a component of the network, the network selects, in response to a control signal to be transmitted from the receiver side, the second number of video signals, which is then transmitted by the network to the receiver. The selection of, or the signaling for, the second number of video signals thus takes place in the network, as a result of which a yet simpler transmitter design may be adequate.

A sixth embodiment of the system according to the invention has the characteristic that the transmitting means are a component of the transmitter.

If the transmitting means form a component of the transmitter, the transmitter selects, in response to a control signal to be transmitted from the receiver side, the second number of video signals, which is then transmitted to the receiver via the network. The selection of, or the signaling for, the second number of video signals thus takes place in the transmitter, as a result of which the second number of video signals is therefore transmitted from the centrally situated transmitter, which simplifies the distribution of said second number of video signals.

A seventh embodiment of the system according to the invention has the characteristic that the third number of video signals corresponds to the first number of video signals.

In this case, all the available video signals of, for example, fifty television programs of low quality are transmitted collectively and the second number of video signals of high quality is transmitted in addition, with the result that no control signal at all is required for briefly running through the total range of television programs. Furthermore, the third number of video signals is then transmitted at the transmitting end completely independently of the second number of video signals, which permits a less complicated design of the transmitting end.

The invention relates still furthermore to a transmitter for coupling to a channel for offering, via the channel, to a receiver side coupled to the channel, a first number of video signals originating from the transmitter, which transmitter is provided with yet further transmitting means for transmitting a first number of video signals.

The transmitter according to the invention has the characteristic that the transmitter is provided with further transmitting means for transmitting to the receiver side a third number of video signals which comprises at least a portion of the first number of video signals, which further transmitting means transmit the third number of video signals with lower quality than the first number of video signals to be transmitted by yet further transmitting means.

A first embodiment of the transmitter according to the invention has the characteristic that the transmitter is provided with transmitting means for selecting, in response to a control signal originating from the receiver side, and transmitting to the receiver side a second number of video signals which comprises a portion of the first number of video signals, which transmitting means transmit the second number of video signals with the same quality as the first number of video signals to be transmitted by yet further transmitting means.

A second embodiment of the transmitter according to the invention has the characteristic that the third number of video signals corresponds to the first number of video signals.

The invention relates still furthermore to a network for coupling a transmitter to a receiver for offering to a receiver side coupled to the network a first number of video signals originating from the transmitter, which transmitter is provided with yet further transmitting means for transmitting a first number of video signals.

The network according to the invention has the characteristic that the network is provided with further transmitting means for transmitting to the receiver a third number of video signals which comprises at least a portion of the first number of video signals, which further transmitting means transmit the third number of video signals with lower quality than the first number of video signals to be transmitted by yet further transmitting means.

A first embodiment of the network according to the invention has the characteristic that the network is provided with transmitting means for selecting, in response to a control signal originating from the receiver side, and transmitting to the receiver a second number of video signals which comprises a portion of the first number of video signals, which transmitting means transmit the second number of video signals with the same quality as the first number of video signals to be transmitted by yet further transmitting means.

A second embodiment of the network according to the invention has the characteristic that the third number of video signals corresponds to the first number of video signals.

The invention also relates to a receiver for coupling to a channel in order to be offered a first number of video signals from a transmitter coupled to the channel, which receiver is provided with receiving means for receiving a second number of video signals to be selected and transmitted by the transmitter, which second number comprises a portion of the first number of video signals.

The receiver according to the invention has the characteristic that the receiver is provided with further receiving means for receiving a third number of video signals of lower quality to be transmitted by the transmitter than the second number of video signals, which third number of video signals comprises at least another portion of the first number of video signals.

A first embodiment of the receiver according to the invention has the characteristic that the third number of video signals corresponds to the first number of video signals.

A second embodiment of the receiver according to the invention has the characteristic that the receiver is provided with generating means for generating and transmitting to the transmitter via the channel a control signal for the selection by the transmitter, in response to said control signal, and the transmission to the receiver of the second number of video signals.

Reference

■ A BELGIAN BROADBAND ATM-EXPERIMENT, by R. David, M. Fastrez, J. Bauwens, A. Vleeshouwer, M. Christiaens and J. van Vyve, XIIIth International Switching Symposium, Stockholm-Sweden, May 27–Jun. 1, 1990, pages 1–6.

■ Dutch patent application NL 9401150 (priority document)

All references are deemed to be incorporated in this patent application.

BRIEF DESCRIPTION OF THE DRAWINGS

The invention will be explained in greater detail by reference to an exemplary embodiment shown in the figures. In the figures:

FIG. 3 shows a system according to the invention, comprising a transmitter according to the invention, a network according to the invention and a receiver according to the invention, FIG. 4 shows a system according to the invention, comprising a network according to the invention and a receiver according to the invention.

DETAILED DESCRIPTION

Figure 1:
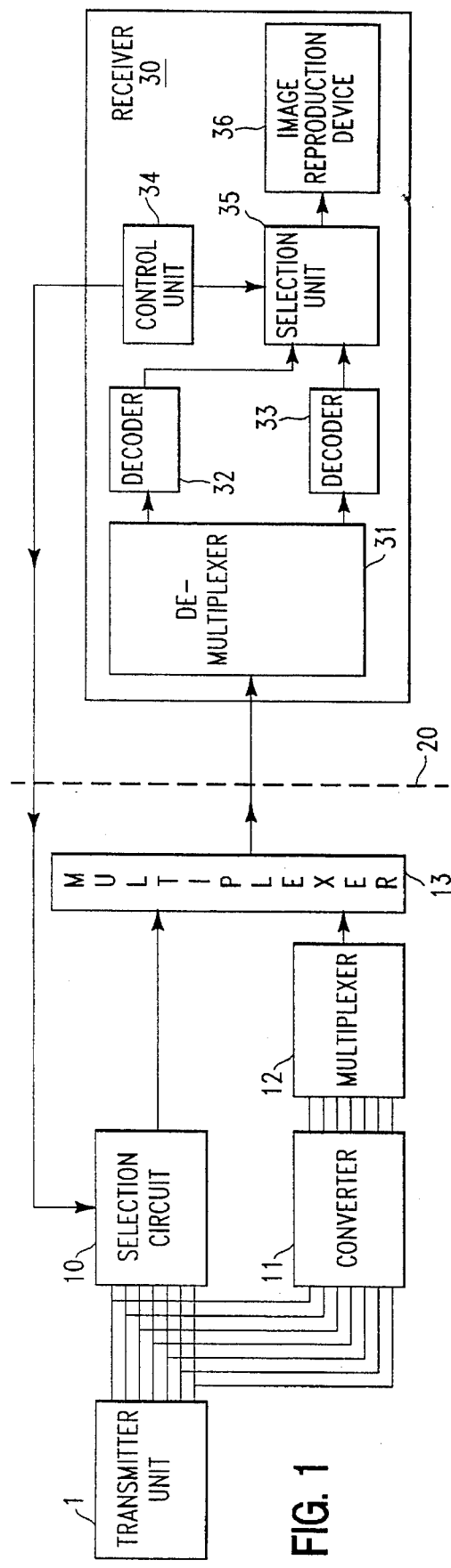
FIG. 1 shows a first system for performing a method according to the invention.

The first system shown in FIG. 1 for performing a method according to the invention has a transmitting side on the left-hand side of the broken line 20 and a receiver side on the right-hand side of the broken line 20. Situated at the transmitting side are a transmitter unit 1 for generating a first number (for example, equal to seven) of video signals of high quality, a selection circuit 10 coupled to transmitter unit 1 for selecting a second number (for example, equal to one) of video signals of high quality from the first number of video signals, a converter 11 coupled to transmitter unit 1 for converting the first number of video signals of high quality into a third number (for example, equal to seven) of video signals of low quality, a multiplexer 12 coupled to converter 11 for multiplexing the third number of video signals, and a multiplexer 13 coupled to selection circuit 10 and multiplexer 12 for multiplexing the second number of video signals and the multiplexed third number of video signals. Situated at the receiver side is a receiver 30 for receiving the second number of video signals of high quality and the multiplexed third number of video signals of low quality. Because said second number and multiplexed third number of video signals are mutually multiplexed, receiver 30 should be provided with a demultiplexer 31 which demultiplexes both numbers of video signals. The second number of video signals of high quality thus obtained is fed to decoder 32 which decodes said second number of video signals and feeds it to selection unit 35, and the multiplexed third number of video signals of low quality thus obtained is fed to decoder 33, which demultiplexes and decodes said third number and feeds it to selection unit 35. Selection unit 35 transmits one of the video signals to image reproduction device 36 under the control of a signal originating from control unit 34. Control unit 34 comprises, for example, an infrared receiver (IR receiver) for receiving signals transmitted by an infrared transmitter (IR transmitter) belonging to a remote-control unit for operating receiver 30 and for, inter alia, selecting a video signal to be reproduced. Furthermore, control unit 34 transmits a control signal to selection circuit 10 for selecting a second number of video signals of high quality from the first number of video signals.

On the basis of the first system shown in FIG. 1 for implementing the method according to the invention, the method according to the invention proceeds as follows. At the transmitting side, the first number of video signals of high quality is generated by transmitter unit 1, which first number of video signals is offered to receiver 30 at the receiver side, by transmitting the control signal from the receiver side to the transmitting side, by selecting, in response to the control signal at the transmitting side, the second number of video signals of high quality from the first number of video signals of high quality and by transmitting said second number of video signals to the receiver side. In practice, the offering of the first number of video signals to the receiver side therefore means that, at the receiver side, only a portion of the first number of video signals is simultaneously available at the receiver side and that another portion becomes available only after signaling (the transmission of the control signal), in which case the availability of the first portion lapses. This way of offering video signals of high quality is generally necessary if there is insufficient channel capacity to transmit the entire first number of video signals. If a user at the receiver side wishes to run through briefly the entire first number of video signals in order to obtain an impression of the entire program range (the so-called "zapping"), several signalings (control signals to be transmitted) will therefore be necessary. In particular, at the end of popular programs, many users will want to zap at the same instant, which could result in overloading of the signaling. To avoid this, according to the method according to the invention, a third number of video signals of low quality is derived from the first number of video signals of high quality, which third number of video signals at least corresponds to a portion of the first number of video signals (apart from quality differences) other than the second number of video signals and, for example, corresponds completely to the first number of video signals (apart from quality differences), and said third number of video signals is fed to the receiver side. As a result, a user at the receiver side has available a greater range of video signals, and although a portion thereof are video signals of lower quality, this is of secondary importance as regards the zapping. As soon as the user has chosen a certain video signal, it is transmitted to the user, if necessary after signaling, as a video signal of high quality.

Figure 2:
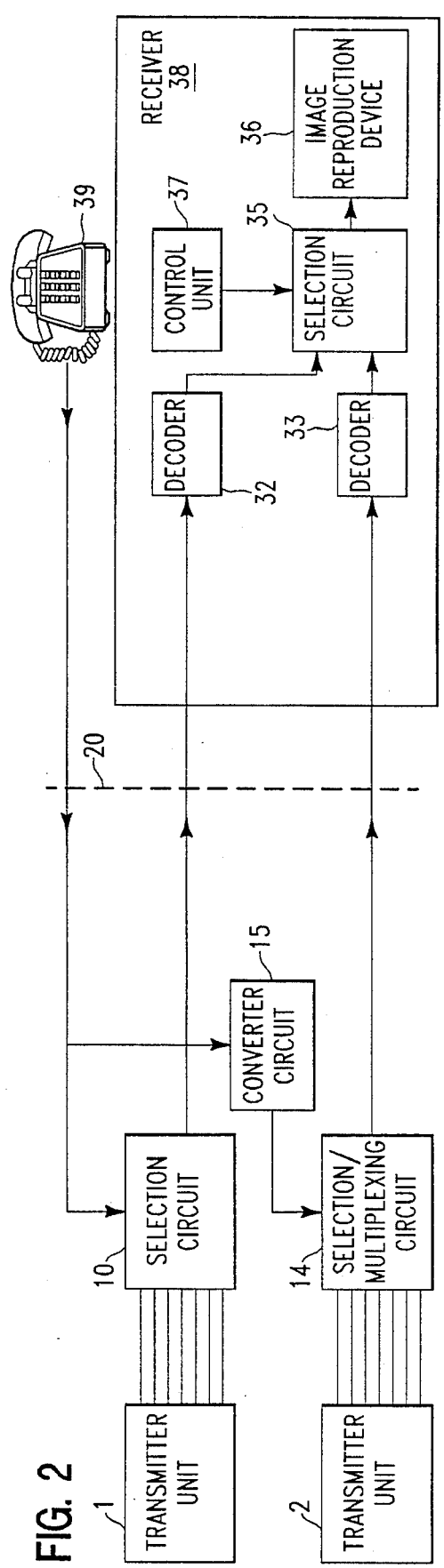
FIG. 2 shows a second system for performing a method according to the invention.

The second system shown in FIG. 2 for performing a method according to the invention has a transmitting side on the left-hand side of the broken line 20 and a receiver side on the right-hand side of the broken line 20. Situated at the transmitting side are transmitter unit 1 for generating a first number (for example, equal to seven) of video signals of high quality and a selection circuit 10 coupled to transmitter unit 1 for selecting a second number (for example, equal to one) of video signals of high quality from the first number of video signals. Furthermore, situated at the transmitting end are further transmitter unit 2 for generating a fourth number (for example, equal to seven) of video signals of low quality which completely corresponds (apart from quality differences) to the first number of video signals of high quality and a selection/multiplexing circuit 14 coupled to further transmitter unit 2 for selecting a third number of video signals of low quality from the fourth number of video signals of low quality and then multiplexing said third number of video signals of low quality. Selection/multiplexing circuit 14 is furthermore coupled to converter circuit 15 which converts a control signal to be fed to selection circuit 10 into another control signal intended for selection/multiplexing circuit 14. Situated at the receiver side is a receiver 38 for receiving the second number of video signals of high quality and the multiplexed third number of video signals of low quality. Because said second number and multiplexed third number of video signals are transmitted separately, the second number of video signals of high quality is fed to decoder 32, which decodes said second number of video signals and feeds it to selection unit 35, and the multiplexed third number of video signals of low quality thus obtained is fed to decoder 33, which demultiplexes and decodes said third number and feeds it to selection unit 35. Selection unit 35 transmits one of the video signals to image reproduction device 36 under the control of a signal originating from control unit 37. Control unit 37 comprises, for example, an infrared receiver (IR receiver) for receiving signals transmitted by an infrared transmitter (IR transmitter) belonging to a remote-control unit for operating receiver 38 and for, inter alia, selecting a video signal to be reproduced. A control signal is transmitted via a telephone set 39 to selection circuit 10 for selecting a second number of video signals of high quality from the first number of video signals, which control signal is furthermore fed to converter circuit 15, which converts said control signal into another control signal for selecting the third number (for example, equal to six) of video signals of low quality from the fourth number of video signals of low quality.

On the basis of the second system shown in FIG. 2 for performing the method according to the invention, the method according to the invention proceeds as follows. At the transmitting side, the first number of video signals of high quality is generated by transmitter unit 1, which first number of video signals is offered to receiver 38 at the receiver side, by transmitting the control signal from the receiver side to the transmitting side, by selecting, in response to the control signal at the transmitting end, the second number of video signals of high quality from the first number of video signals of high quality and by transmitting said second number of video signals to the receiver side. The control signal is converted into the other control signal, and in response to said other control signal, the third number of video signals of low quality is derived from the fourth number of video signals of low quality, which third number of video signals corresponds, for example, to the remaining portion of the first or fourth number of video signals which has not yet been transmitted as the second number of video signals. Said third number of video signals is then fed to the receiver side. As a result, a user at the receiver side has available a greater range of video signals, and although a portion thereof are video signals of lower quality, this is of secondary importance as regards the zapping. As soon as the user has chosen a certain video signal, it is transmitted to the user, if necessary after signaling via the telephone set, as a video signal of high quality.

The system according to the invention shown in FIG. 3 comprises, on the left-hand side of broken line 40, a transmitter according to the invention which comprises transmitter unit 1, further transmitter unit 2 and an access circuit 3. Situated between the two broken lines 40 and 60 is a network according to the invention which comprises a selection circuit 10 coupled to transmitter unit 1 and access circuit 3, a multiplexer 12 coupled to further transmitter unit 2, a node 41 coupled to access circuit 3 and selection circuit 10, a node 42 coupled to node 41, a node 43 coupled to multiplexer 12, a node 4 coupled to node 43 and a node 45 coupled to node 44. Situated on the right-hand side of broken line 60 is a receiver according to the invention which comprises a receiver 59 which is provided with a decoder 32 coupled to node 42, a decoder 33 coupled to node 45, a selection unit 35 coupled to decoders 32 and 33, an image reproduction device 36 coupled to selection unit 35 and a control unit 34 coupled to selection unit 35 and node 42.

The operation of the system shown in FIG. 3 is as follows. Transmitter unit 1 generates the first number of video signals of high quality, which is fed to selection circuit 10. In response to a control signal, selection circuit 10 selects a second number of video signals of high quality from the first number of video signals and transmits said second number to receiver 59 via nodes 41 and 42. Control unit 34 generates the control signal, which is fed via nodes 42 and 41 to access circuit 3, which investigates whether the user concerned is authorized (for example, in connection with accounts which may or may not have been settled) to transmit the control signal. If the user is authorized, the control signal is passed to selection circuit 10. Further transmitter unit 2 generates the fourth number of video signals of low quality, which (apart from quality differences) corresponds to the first number of video signals and which is fed to multiplexer 12, which multiplexes said fourth number of video signals and transmits it to receiver 59 via nodes 43, 44 and 45. The latter has a decoder 32 which decodes said second number of video signals and feeds it to selection unit 35, and has a decoder 33 which demultiplexes and decodes said fourth number of video signals and feeds it to selection unit 35. Selection unit 35 transmits one of the video signals to image reproduction device 36 under the control of a signal originating from control unit 34. Control unit 34 comprises, for example, an infrared receiver (IR receiver) for receiving signals transmitted by an infrared transmitter (IR transmitter) belonging to a remote-control unit for operating receiver 59 and for, inter alia, selecting a video signal to be reproduced. Control unit 34 furthermore transmits a control signal via nodes 42 and 41 to selection circuit 10 for selecting a second number of video signals of high quality from the first number of video signals.

The system according to the invention shown in FIG. 4 comprises, on the left-hand side of broken line 40, transmitter unit 1. Situated between the two broken lines 40 and 60 is a network according to the invention, which comprises a selection circuit 10 coupled to transmitter unit 1, a converter 11 coupled to transmitter unit 1, a multiplexer 12 coupled to converter 11, a multiplexer 13 coupled to multiplexer 12 and selection circuit 10, a nodes 46 coupled to selection circuit 10, a node 47 coupled to node 46, a node 48 coupled to node 47, a node 49 coupled to multiplexer 13 and a node 50 coupled to node 49. Situated on the right-hand side of broken line 60 is a receiver according to the invention, which comprises a receiver 38 which is provided with a demultiplexer 31 coupled to node 50, decoders 32 and 33 coupled to demultiplexer 31, a selection unit 35 coupled to decoders 32 and 33, an image reproduction device 36 coupled to selection unit 35 and a control unit 37 coupled to selection unit 35. Furthermore situated on the right-hand side of broken line 60 is a telephone set 39 for generating the control signal.

The operation of the system shown in FIG. 4 is as follows. Transmitter unit 1 generates the first number of video signals of high quality, which is fed to selection circuit 10. In response to a control signal, selection circuit 10 selects a second number of video signals of high quality from the first number of video signals and transmits said second number of video signals to multiplexer 13. The control signal, which is fed via nodes 48, 47 and 46 to selection circuit 10, is generated via telephone set 39. The converter 11 coupled to transmitter unit 1 converts the first number of video signals of high quality into a third number of video signals of low quality and feeds said third number of video signals to multiplexer 12, which multiplexes said third number of video signals and then supplies the multiplexed third number of video signals to multiplexer 13, which multiplexes the multiplexed third number of video signals and the second number of video signals. From multiplexer 13, the multiplexed signal is transmitted via nodes 49 and 50 to receiver 38. In receiver 38, the multiplexed signal is demultiplexed by demultiplexer 31, after which decoder 32 decodes the second number of video signals and feeds it to selection unit 35, and decoder 33 demultiplexes and decodes the third number of video signals and feeds it to selection unit 35. Selection unit 35 transmits one of the video signals to image reproduction device 36 under the control of a signal originating from control unit 37. Control unit 37 comprises, for example, an infrared receiver (IR receiver) for receiving signals transmitted by an infrared transmitter (IR transmitter) belonging to a remote-control unit for operating receiver 38 and for, inter alia, selecting a video signal to be reproduced. Via telephone set 39, a control signal is transmitted via nodes 48, 47 and 46 to selection circuit 10 for selecting a second number of video signals of high quality from the first number of video signals.

Figure 5:
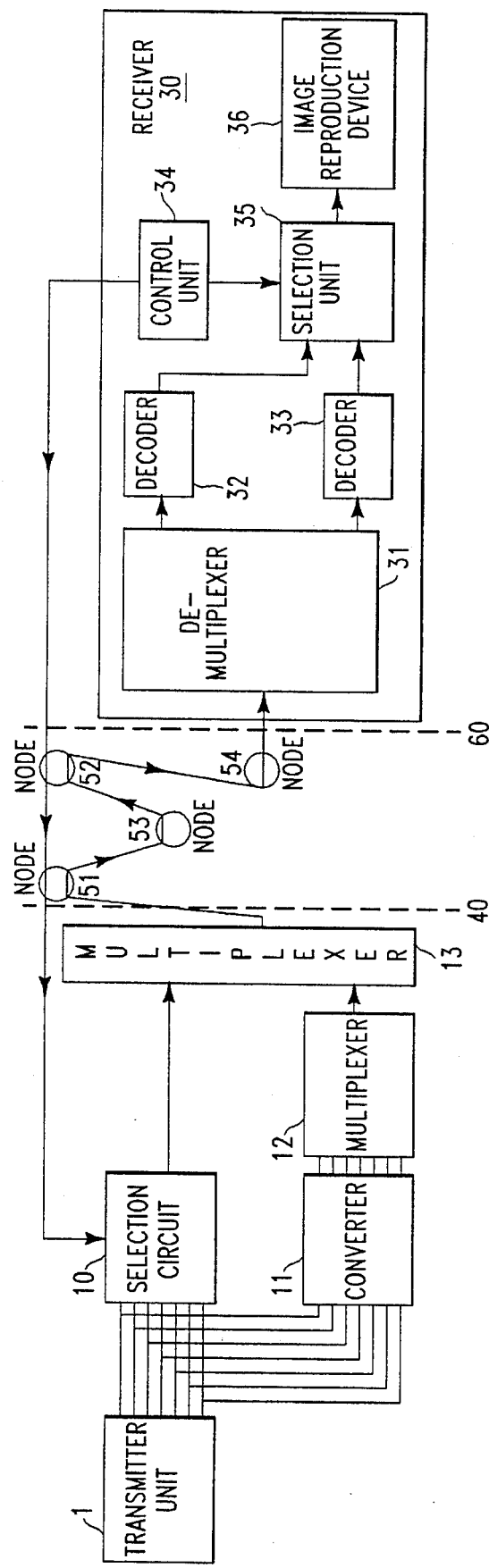
FIG. 5 shows a system according to the invention, comprising a transmitter according to the invention and a receiver according to the invention.

The system according to the invention shown in FIG. 5 comprises, on the left-hand side of broken line 40, a transmitter according to the invention, which comprises transmitter unit 1, a selection circuit 10 coupled to transmitter unit 1, a converter 11 coupled to transmitter unit 1, a multiplexer 12 coupled to converter 11, and a multiplexer 13 coupled to multiplexer 12 and selection circuit 10. Situated between the two broken lines 40 and 60 is a network which comprises a node 51 coupled to selection circuit 10 and to multiplexer 13, nodes 52 and 53 coupled to node 51, and a node 54 coupled to node 52. Situated on the right-hand side of broken line 60 is a receiver according to the invention, which comprises a receiver 30, which is provided with a demultiplexer 31 coupled to node 54, decoders 32 and 33 coupled to demultiplexer 31, a selection unit 35 coupled to decoders 32 and 33, an image reproduction device 36 coupled to selection unit 35 and a control unit 34 which is coupled to selection unit 35 and is furthermore coupled to node 52.

The operation of the system shown in FIG. 5 is as follows. Transmitter unit 1 generates the first number of video signals of high quality, which is fed to selection circuit 10. In response to a control signal, selection circuit 10 selects a second number of video signals of high quality from the first number of video signals and transmits said second number of video signals to multiplexer 13. The control signal, which is fed via nodes 52 and 51 to selection circuit 10, is generated via control unit 34. The converter 11 coupled to transmitter unit 1 converts the first number of video signals of high quality into a third number of video signals of low quality and feeds said third number of video signals to multiplexer 12, which multiplexes said third number of video signals and then supplies the multiplexed third number of video signals to multiplexer 13, which multiplexes the multiplexed third number of video signals and the second number of video signals. From multiplexer 13, the multiplexed signal is transmitted via nodes 51, 53, 52 and 54 to receiver 30. In receiver 30, the multiplexed signal is demultiplexed by demultiplexer 31, after which decoder 32 decodes the second number of video signals and feeds it to selection unit 35 and decoder 33 demultiplexes and decodes the third number of video signals and feeds it to selection unit 35. Selection unit 35 transmits one of the video signals to image reproduction device 36 under the control of a signal originating from control unit 34. Control unit 34 comprises, for example, an infrared receiver (IR receiver) for receiving signals transmitted by an infrared transmitter (IR transmitter) belonging to a remote-control unit for operating receiver 30 and for, inter alia, selecting a video signal to be reproduced. Via control unit 34, a control signal is transmitted via nodes 52 and 51 to selection circuit 10 for selecting a second number of video signals of high quality from the first number of video signals.

Video signals of high quality are, for example, digital video signals coded according to the MPEG-2 standard, transmitter unit 1 comprising so-called MPEG-2 encoders. If these encoders are each composed of pyramidal layers, a video signal of high quality will originate from the highest layer, in which case a video signal originating from a lower layer will then be a corresponding video signal of low quality. Transmitter unit 1, further transmitter unit 2 and converter 11 can therefore be implemented by using MPEG-2 encoders in FIGS. 3 and 5. Video signals of low quality could also be formed by analog video signals built up according to the PAL standard or NTSC standard, in which case further transmitter unit 2 will comprise so-called PAL encoders or NTSC encoders. In that case, converter 11 comprises so-called MPEG-2 decoders and PAL encoders or NTSC encoders coupled thereto. Furthermore, video signals of high quality could be formed by analog video signals built up according to the HDTV standard, in which case further transmitter unit 2 will comprise, for example, so-called MAC encoders. In that case, converter 11 comprises so-called MAC decoders and PAL encoders or NTSC encoders coupled thereto.

If the video signals of high quality are digital video signals encoded according to the MPEG-2 standard and transmitter unit 1 comprises so-called MPEG-2 encoders which are each composed of pyramidal layers, it becomes possible to replace the two decoders 32 and 33 by one so-called MPEG-2 decoder which automatically adjusts, for example, to the desired quality of the video signal to be decoded. If the video signals of low quality are formed by analog video signals built up according to the PAL standard or the NTSC standard, decoder 33 should be a so-called PAL decoder or NTSC decoder, while decoder 32 is, for example, a MPEG-2 decoder. If the video signals of high quality are formed by analog video signals built up according to the HDTV standard, decoder 32 should be, for example, a so-called MAC decoder, while decoder 33 is, for example a PAL decoder or NTSC decoder.

Access circuit 3 comprises, for example, a table memory in which an identification code with associated data is stored for each user. The control signal should then be provided with an identification code and a program code, it being investigated on the basis of the identification code in the table memory whether the user concerned is authorized, and selection circuit 10 being set on the basis of the program code. In a simplest version, selection circuit 10 comprises, for example, a switch which, depending on the program code, couples through one of the inputs to the output. In a more complicated version (for example, because the second number of video signals of high quality is greater than one and is, for example, equal to two), selection circuit 10 comprises, for example, two switches which each couple through one of the inputs to a multiplexer, which multiplexer then multiplexes the two signals. In that case, decoder 32, just like decoder 33, should also have a demultiplexing function and, for example, both a television set and a video recorder may each be offered another video signal of high quality. Selection unit 35 comprises, for example, a switch to which the one or two video signals of high quality originating from decoder 32 are fed and to which the various video signals of low quality originating from decoder 33 are fed, and which feeds one of these signals to image reproduction device 36 under the control of control unit 34 or 37. Selection/multiplexing circuit 14 is formed, for example, by a selection circuit 10 and a multiplexer 12 coupled thereto, the selection section of converter circuit 15 being fed the other control signal. If the control signal comprises, for example, a program code 1 which indicates that the user wants to watch a first video signal having high quality, converter circuit 14 could generate the other control signal with program codes 2, 3, 4, 5, 6 and 7 in response to the control signal in order to be able to offer in this way a second, third, fourth, fifth, sixth and seventh video signal of low quality via selection/multiplexing circuit 14.

Obviously, selection circuit 10 and selection/multiplexing circuit 14 can be provided with default values so that it is possible to start with a standard program range on the following day. Thus, it is possible, for example, for a user to indicate that he should be provided with a first and a second video signal of high quality and with a third to fortieth video signal, inclusive, of low quality as standard. If the user then wishes to watch one of the third to fortieth video signals, inclusive, having high quality, he has to signal this via the control signal and if he wishes to watch the forty-first to sixtieth video signal, inclusive, having low quality, this also has to be signaled. Preferably, however, all the available video signals should be offered simultaneously with low quality.

It should be pointed out that, for example, if a so-called ATM network is used, transmitting means 10, inter alia, do not need to be concentrated per se at one location but that they may be spread over a number of nodes, it being determined for each node which signal has to be transmitted to which user. In this case, therefore, use is advantageously made of the distribution characteristic or broadcasting characteristic of such a type of network. Furthermore, the multiplexing of the third number of video signals is not essential because each video signal belonging to the third number of video signals could be transmitted via a separate, so-called virtual channel. The same applies to the other multiplexing function belonging to the system. The first demultiplexing and subsequent decoding and subsequent selection in the receiver is, of course, only an exemplary embodiment. A higher efficiency of the receiver could be achieved by arranging for the selection to take place before decoding is carried out or by arranging for the selection and demultiplexing to be combined and the decoding to take place thereafter.

The system (FIGS. 3, 4, 5) according to the invention comprises at least one channel, at least one receiver coupled to the channel (FIG. 3: 59, FIG. 4: 38, FIG. 5: 30) and at least one transmitter coupled to the channel (FIG. 3: 1, 2, 3, FIG. 4: 1, FIG. 5: 1, 10, 11, 12, 13) for offering the receiver, via the channel, a first number of video signals originating from the transmitter, which system is provided with generating means (FIG. 3: 34, FIG. 4: 39, FIG. 5: 34) for generating a control signal intended for the transmitter, and which system is provided with transmitting means (FIG. 3: 10, FIG. 4: 10, FIG. 5: 10) for selecting, in response to the control signal, and transmitting to the receiver a second number of video signals which comprises a portion of the first number of video signals, and is characterized in that the system is provided with further transmitting means (FIG. 3: 2, FIG. 4: 11, FIG. 5: 11) for transmitting to the receiver a third number of video signals which comprises at least another portion of the first number of video signals, which further transmitting means transmit the third number of video signals with lower quality than the second number of video signals to be transmitted by the transmitting means.

An embodiment (FIGS. 3, 5) of the system has the characteristic that the further transmitting means are a component of the transmitter.

An embodiment (FIG. 5) of the system has the characteristic that the transmitting means are a component of the transmitter.

An embodiment (FIGS. 3, 4) of the system has the characteristic that the system is provided with a network which comprises the channel, the transmitting means being a component of the network and the transmitter being provided with yet further transmitting means (FIG. 3: 1, FIG. 4: 1) for transmitting the first number of video signals.

An embodiment (FIG. 4) of the system has the characteristic that the system is provided with a network which comprises the channel, the further transmitting means being a component of the network and the transmitter being provided with yet further transmitting means for transmitting the first number of video signals.

An embodiment (FIG. 4) of the system has the characteristic that the transmitting means are a component of the network.

An embodiment of the system has the characteristic that the transmitting means are a component of the transmitter.

An embodiment of the system has the characteristic that the third number of video signals corresponds to the first number of video signals.

The transmitter according to the invention (FIGS. 3, 5) for coupling to a channel for offering, via the channel to a receiver side coupled to the channel, a first number of video signals originating from the transmitter, which transmitter is provided with yet further transmitting means for transmitting a first number of video signals and is characterized in that the transmitter is provided with further transmitting means for transmitting to the receiver side a third number of video signals which comprises at least a portion of the first number of video signals, which further transmitting means transmit the third number of video signals with lower quality than the first number of video signals to be transmitted by the yet further transmitting means.

An embodiment (FIG. 5) of the transmitter has the characteristic that the transmitter is provided with transmitting means for selecting, in response to a control signal originating from the receiver side, and transmitting to the receiver side a second number of video signals which comprises a portion of the first number of video signals, which transmitting means transmit the second number of video signals with the same quality as the first number of video signals to be transmitted by the yet further transmitting means.

An embodiment of the transmitter has the characteristic that the third number of video signals corresponds to the first number of video signals.

The network according to the invention (FIGS. 3, 4) for coupling a transmitter to a receiver for offering to a receiver side coupled to the network a first number of video signals originating from the transmitter, which transmitter is provided with yet further transmitting means for transmitting a first number of video signals is characterized in that the network is provided with further transmitting means for transmitting to the receiver a third number of video signals which comprises at least a portion of the first number of video signals, which further transmitting means transmit the third number of video signals with lower quality than the first number of video signals to be transmitted by the yet further transmitting means.

An embodiment (FIGS. 3, 4) of the network has the characteristic that the network is provided with transmitting means for selecting, in response to a control signal originating from the receiver side, and transmitting to the receiver a second number of video signals which comprises a portion of the first number of video signals, which transmitting means transmit the second number of video signals with the same quality as the first number of video signals to be transmitted by the yet further transmitting means.

An embodiment of the network has the characteristic that the third number of video signals corresponds to the first number of video signals.

The receiver according to the invention (FIGS. 3, 4, 5) for coupling to a channel, in order to be offered a first number of video signals from a transmitter coupled to the channel, is provided with receiving means (32) for receiving a second number of video signals, to be selected and transmitted by the transmitter, which second number comprises a portion of the first number of video signals and is characterized in that the receiver is provided with further receiving means (33) for receiving a third number of video signals of lower quality to be transmitted by the transmitter than the second number of video signals, which third number of video signals comprises at least another portion of the first number of video signals.

An embodiment of the receiver has the characteristic that the third number of video signals corresponds to the first number of video signals.

An embodiment of the receiver has the characteristic that the receiver is provided with generating means (34) for generating and transmitting to the transmitter via the channel a control signal for the selection by the transmitter, in response to said control signal, and the transmission to the receiver of the second number of video signals.

What is claimed is:

1. A method of offering to a receiver, a first set of video signals originating from a transmitter, each of the first set of video signals including video data, the method comprising the steps of:

transmitting a control signal from the receiver to the transmitter;

in response to the control signal,
selecting at the transmitter a second set of video signals which includes a subset of the first set of video signals, and
transmitting from the transmitter the second set of video signals to the receiver;

transmitting from the transmitter to the receiver a third set of video signals, the third set of video signals including a particular video signal corresponding to one of the first set of video signals not included in the second set of video signals, the particular video signal having a data content that is less than the data content of the corresponding one of the first set of video signals.

2. The method of claim 1, wherein the first and third sets of video signals include the same number of video signals, such that video data corresponding to at least one of the first set of video signals is included in both the second and third sets of video signals.

3. A system comprising:

a channel for communicating video signals;

a receiver coupled to the channel;

a transmitter coupled to the channel, for offering the receiver, via the channel, a first set of video signals originating from the transmitter, each of the first set of video signals including video data, generating means for generating a transmitter control signal, first transmitting means for selecting, in response to the transmitter control signal, and transmitting to the receiver a second set of video signals which comprises a subset of the first set of video signals; and second transmitting means for transmitting to the receiver a third set of video signals, the third set of video signals including a particular video signal corresponding to one of the first set of video signals, the particular video signal having a data content that is less than the data content of the corresponding one of the first set of video signals.

4. The system of claim 3, wherein the second transmitting means are a component of the transmitter.

5. The system of claim 4, wherein the first transmitting means are a component of the transmitter.

6. The system of claim 4, further comprising:

a network which includes the channel and the first transmitting means; and the transmitter further comprises third transmitting means for transmitting the first set of video signals.

7. The system of claim 3, further comprising:

a network which includes the channel and the second transmitting means; and wherein the transmitter includes third transmitting means for transmitting the first set of video signals.

8. The system of claim 7, wherein the first transmitting means are a component of the network.

9. The system of claim 7, wherein the first transmitting means are a component of the transmitter.

10. The system of claim 3, wherein the first and third sets of video signals include the same number of video signals, such that video data corresponding to at least one of the first set of video signals is included in both the second and third sets of video signals.

11. The system of claim 4, wherein the first and third sets of video signals include the same number of video signals, such that video data corresponding to at least one of the first set of video signals ms included in both the second and third sets of video signals.

12. The system of claim 5, wherein the first and third sets of video signals include the same number of video signals, such that video data corresponding to at least one of the first set of video signals ms included in both the second and third sets of video signals.

13. The system of claim 6, wherein the first and third sets of video signals include the same number of video signals, such that video data corresponding to at least one of the first set of video signals ms included in both the second and third sets of video signals.

14. The system of claim 7, wherein the first and third sets of video signals include the same number of video signals, such that video data corresponding to at least one of the first set of video signals ms included in both the second and third sets of video signals.

15. The system of claim 6, wherein the first and third sets of video signals include the same number of video signals, such that video data corresponding to at least one of the first set of video signals ms included in both the second and third sets of video signals.

16. The system of claim 7, wherein the first and third sets of video signals include the same number of video signals, such that video data corresponding to at least one of the first set of video signals is included in both the second and third sets of video signals.

17. A transmitter for coupling to a channel and for offering a first set of video signals via the channel to a receiver, each of the first set of video signals including video data, the transmitter comprising:

first transmitting means for transmitting to the receiver a second set of video signals;

second transmitting means for transmitting to the receiver a third set of video signals, the third set of video signals including a particular video signal corresponding to one of the first set of video signals, the particular video signal having a data content that is less than the data content of the corresponding one of the first set of video signals.

18. The transmitter according to claim 17, further comprising:

selection and transmission means for selecting, in response to a control signal originating from the receiver, one of the first set of video signals for inclusion in the second set of video signals and for transmitting the complete data contents of the selected signal to the receiver.

19. The transmitter according to claim 17, wherein the first and third sets of video signals include the same number of video signals, such that video data corresponding to at least one of the first set of video signals is included in both the second and third sets of video signals.

20. The transmitter according to claim 18, wherein the first and third sets of video signals include the same number of video signals, such that video data corresponding to at least one of the first set of video signals is included in both the second and third sets of video signals.

21. A network for coupling a transmitter to a receiver and for offering to the receiver video signals from a first set of video signals originating from the transmitter, each video signal including video data, the transmitter including first transmitter means for transmitting the first set of video signals, the network comprising:

a network transmitter for transmitting to the receiver a third set of video signals, the third set of video signals including a particular video signal corresponding to one of the first set of video signals but having a data content that is less than the data content of the corresponding one of the first set of video signals.

22. The network of claim 21, further comprising:

selection and transmission means for selecting, in response to a control signal originating from the receiver, one of the first set of video signals for inclusion in the second set of video signals and for transmitting the complete data contents of the selected signal to the receiver.

23. The network of claim 21, wherein the first and third sets of video signals include the same number of video signals, such that video data corresponding to at least one of the first set of video signals is included in both the second and third sets of video signals.

24. The network of claim 22, wherein the first and third sets of video signals include the same number of video signals, such that video data corresponding to at least one of the first set of video signals is included in both the second and third sets of video signals.

25. A receiver for coupling to a channel in order to be offered a first set of video signals from a transmitter coupled to the channel, each of the first set of video signals including video data, the receiver comprising:

first receiving means for receiving a second set of video signals to be selected and transmitted by the transmitter, the second set of video signals including a subset of the first set of video signals; and second receiving means for receiving a third set of video signals, the third set of video signals including a particular video signal corresponding to one of the first set of video signals not included in the second set of video signals, the particular video signal having a data content that is less than the data content of the corresponding one of the first set of video signals.

26. The receiver of claim 25, wherein the first and third sets of video signals include the same number of video signals, such that video data corresponding to at least one of the first set of video signals is included in both the second and third sets of video signals.

27. The receiver according to claim 25, further comprising:

generating means for generating and transmitting to the transmitter, via the channel, a control signal to control the selection by the transmitter of the video signals to be included in the second set of video signals and transmitted to the receiver.

28. The receiver according to claim 26, further comprising:

generating means for generating and transmitting to the transmitter, via the channel, a control signal to control the selection by the transmitter of the video signals to be included in the second set of video signals and transmitted to the receiver.

* * * * *